Jan. 26, 1960 L. E. HARPER 2,922,550

TILTING DISK WEIGHER AND FEEDER

Filed Nov. 4, 1957 8 Sheets-Sheet 1

INVENTOR.
LYNDUS E. HARPER
BY Alfred R. Fuchs
ATTORNEY

Jan. 26, 1960 L. E. HARPER 2,922,550

TILTING DISK WEIGHER AND FEEDER

Filed Nov. 4, 1957 8 Sheets-Sheet 2

INVENTOR.
LYNDUS E. HARPER
BY Alfred R. Fuchs
ATTORNEY

INVENTOR.
LYNDUS E. HARPER
BY
Alfred R. Fuchs
ATTORNEY

Jan. 26, 1960 L. E. HARPER 2,922,550

TILTING DISK WEIGHER AND FEEDER

Filed Nov. 4, 1957 8 Sheets-Sheet 4

INVENTOR.
LYNDUS E. HARPER
BY Alfred R. Fuchs
ATTORNEY

INVENTOR.
LYNDUS E. HARPER
BY Alfred R. Fuchs
ATTORNEY

Jan. 26, 1960 L. E. HARPER 2,922,550

TILTING DISK WEIGHER AND FEEDER

Filed Nov. 4, 1957 8 Sheets-Sheet 6

INVENTOR.
LYNDUS E. HARPER
BY
Alfred R. Fuchs
ATTORNEY

Jan. 26, 1960 L. E. HARPER 2,922,550

TILTING DISK WEIGHER AND FEEDER

Filed Nov. 4, 1957 8 Sheets-Sheet 7

INVENTOR.
LYNDUS E. HARPER
BY Alfred R. Fuchs
ATTORNEY

Jan. 26, 1960 L. E. HARPER 2,922,550

TILTING DISK WEIGHER AND FEEDER

Filed Nov. 4, 1957 8 Sheets-Sheet 8

INVENTOR.
LYNDUS E. HARPER
BY Alfred R. Fuchs
ATTORNEY

United States Patent Office 2,922,550

Patented Jan. 26, 1960

2,922,550

TILTING DISK WEIGHER AND FEEDER

Lyndus E. Harper, West Barrington, R.I., assignor to B-I-F Industries, Inc., a corporation of Rhode Island Application November 4, 1957, Serial No. 694,253

20 Claims. (Cl. 222—55)

My invention relates to continuous weighers and feeders, and more particularly to a tilting disk weigher and feeder.

It is the principal purpose of my invention to provide a tilting disk weighing and feeding device that is so constructed and arranged that the loading of the weighing means and the discharge of the material therefrom takes place on the pivotal axis of the tilting disk device so that the feeding of the material onto the weighing means and the discharge of the material therefrom will have a minimum effect on the accuracy of the weighing action of the conveying means.

More specifically my invention comprises a member that is adapted to receive material to be weighed thereon, that is mounted to tilt about a transverse axis, which member is mounted to rotate about an axis that extends perpendicularly to said transverse axis, which rotatable member has the material that is to be weighed fed onto the same in vertical alignment with said tilting axis and has the means for discharging the material therefrom also located in vertical alignment with said tilting axis.

It is also a specific purpose of my invention to provide conveying means that is adapted to be loaded and discharged on the pivot line of the scale, that positively moves the material to be weighed over a predetermined path between the loading point and discharge point. I accomplish this purpose by providing a disk-like member that is mounted to tilt about a transverse, preferably horizontal, axis, and which has a central portion and a material conveying portion located outwardly of said central portion, in combination with means for feeding material to be weighed onto said peripheral portion substantially in vertical alignment with the tilting axis on one side of the axis of rotation of the disk-like member, and having means for discharging material therefrom in vertical alignment with said tilting axis on the other side of said axis of rotation.

In the form of the invention preferred for weighing and feeding devices of smaller capacity, the material conveying means comprises an inner rigid portion upon which a flexible member is mounted, that extends beyond the periphery of the rigid portion providing an outer flexible portion that is secured to the inner portion to rotate therewith, onto which the material is fed, and a support for the flexible portion extending over only a portion of the path in which it rotates, so that it is supported by said supporting means from a point in advance of the location at which the material is fed onto the same to a point on the opposite side of the axis of rotation of said conveying means, at which discharge of the material being conveyed takes place, said supporting means being stationary, but tiltably mounted on said axis, and said flexible member being preferably in the form of a drag belt slidably engaging said stationary, tiltably mounted supporting means.

In the form of the invention preferred for weighing and feeding devices of large capacity, the rotatably tiltably mounted disk-like member is preferably provided with a central disk portion, as in the other form of the invention, but has instead of the flexible member operating over a stationary support, a rigid peripheral rim portion that is located at a lower level than the central disk-like member, and is provided with scraping means for removing the material from said peripheral portion substantially in vertical alignment with the tilting axis on the opposite side of the axis of rotation of said conveying means from that at which the material to be conveyed is fed onto said peripheral portion.

By providing a rotatable disk-like conveying means, that conveys the material from a feeding means that discharges the material thereon in substantially vertically spaced relation to the horizontal axis about which the disk-like member tilts, to a point of discharge that is similarly located on the opposite side of the axis of rotation of said tiltable disk-like member, positive feed of the material from the loading point to the discharge point is obtained and a very compact weighing and feeding device of high accuracy is obtained.

Whether the invention is made in the way of the high capacity unit or the low capacity unit above referred to, it comprises a tiltably mounted disk-like member and means associated therewith defining a conveying path for the material from the feeding location to the discharge location, that comprises inner and outer upstanding walls that are concentrically curved about the axis of rotation of the disk-like member, and both of which rotate with said disk-like member, in the form of the invention in which the flexible conveying means is provided, but in which only the inner upstanding wall rotates with the disk-like member in the higher capacity unit, said upstanding wall depending from the central raised disk-like portion in this form of the invention.

Other objects and advantages of my invention will appear as the description of the drawings proceeds. I desire to have it understood, however, that I do not intend to limit myself to the particular details shown or described, except as defined in the claims.

Figure 1:
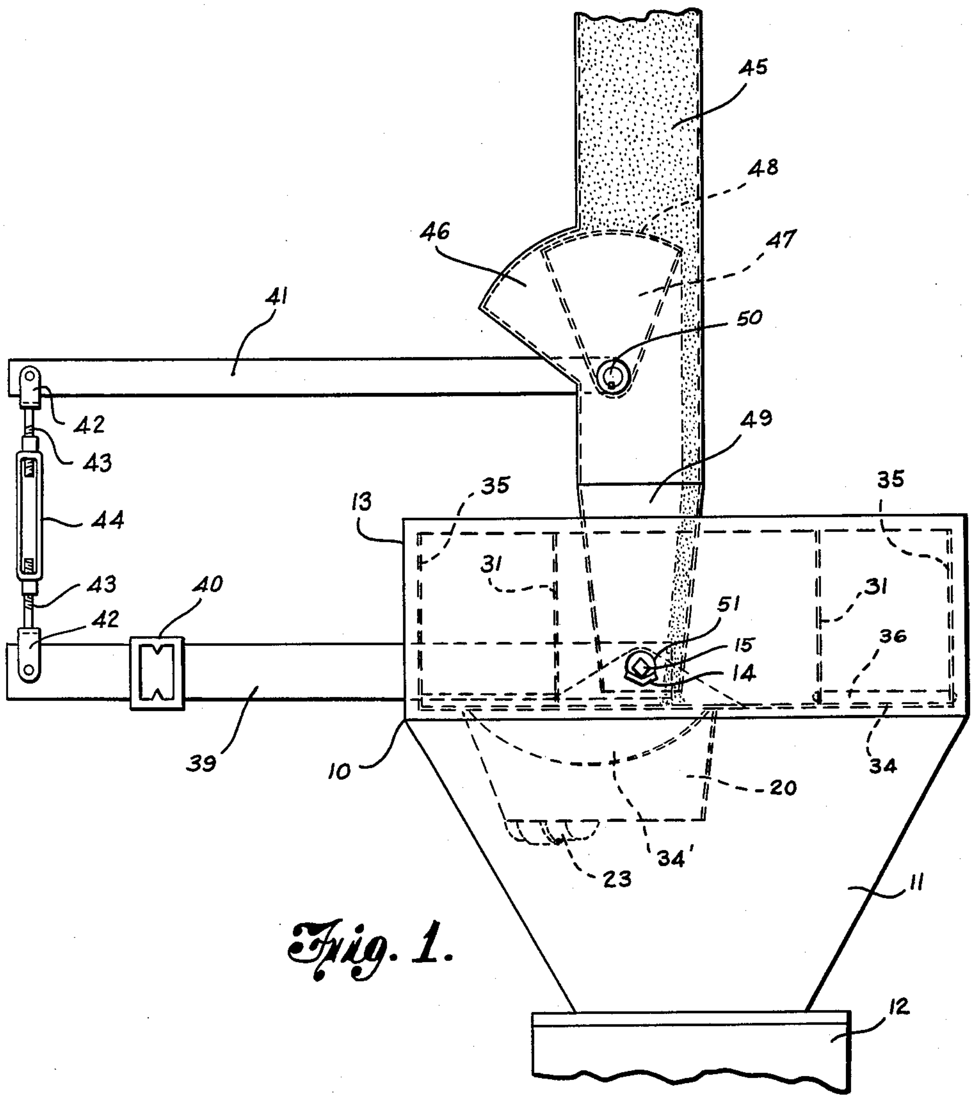
Fig. 1 is a view in side elevation of my improved weighing and feeding means utilizing the flexible conveying means.
Figure 2:
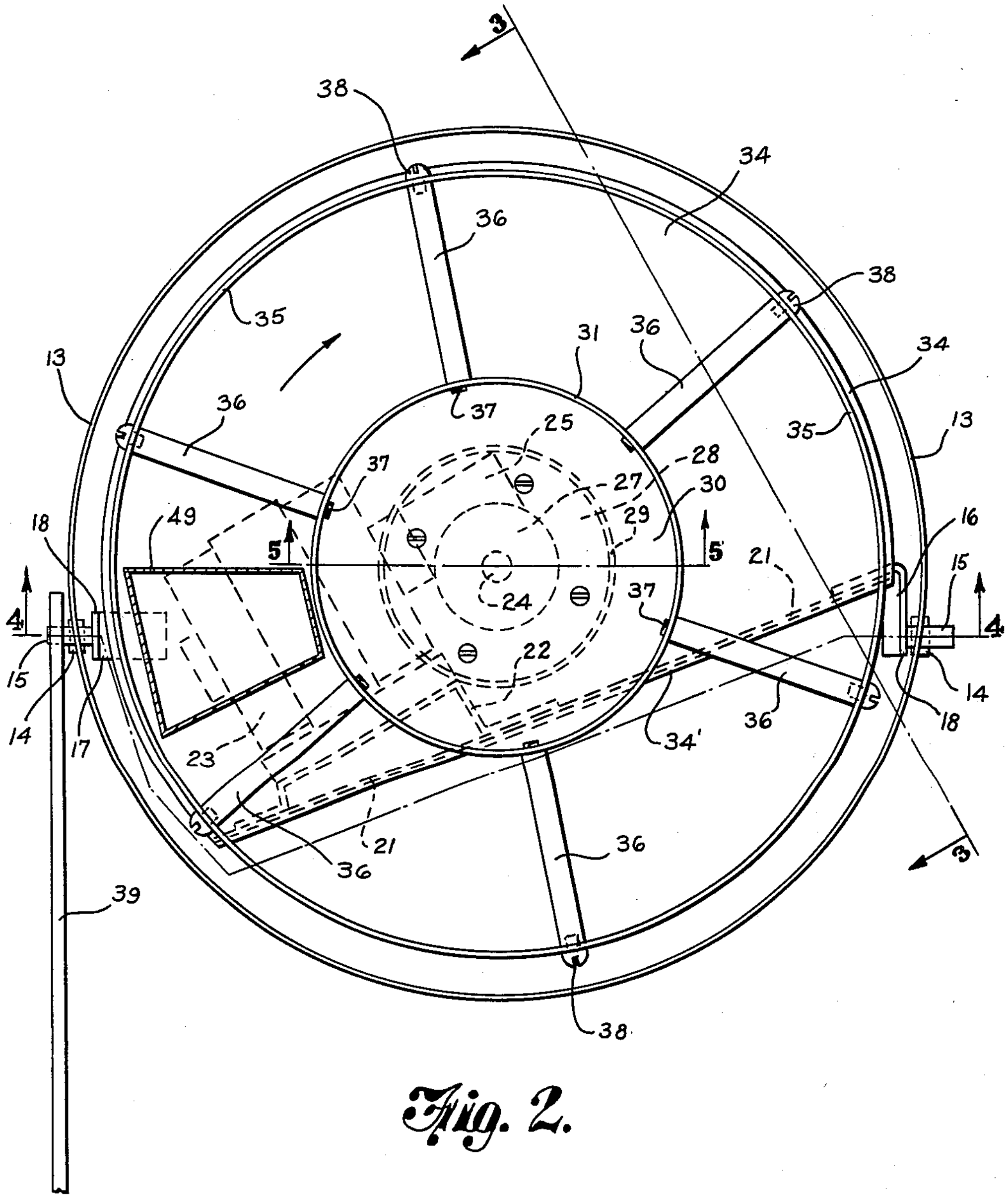
Fig. 2 is a plan view, partly in horizontal section, of the form of the invention shown in Fig. 1, partly broken away.
Figure 3:
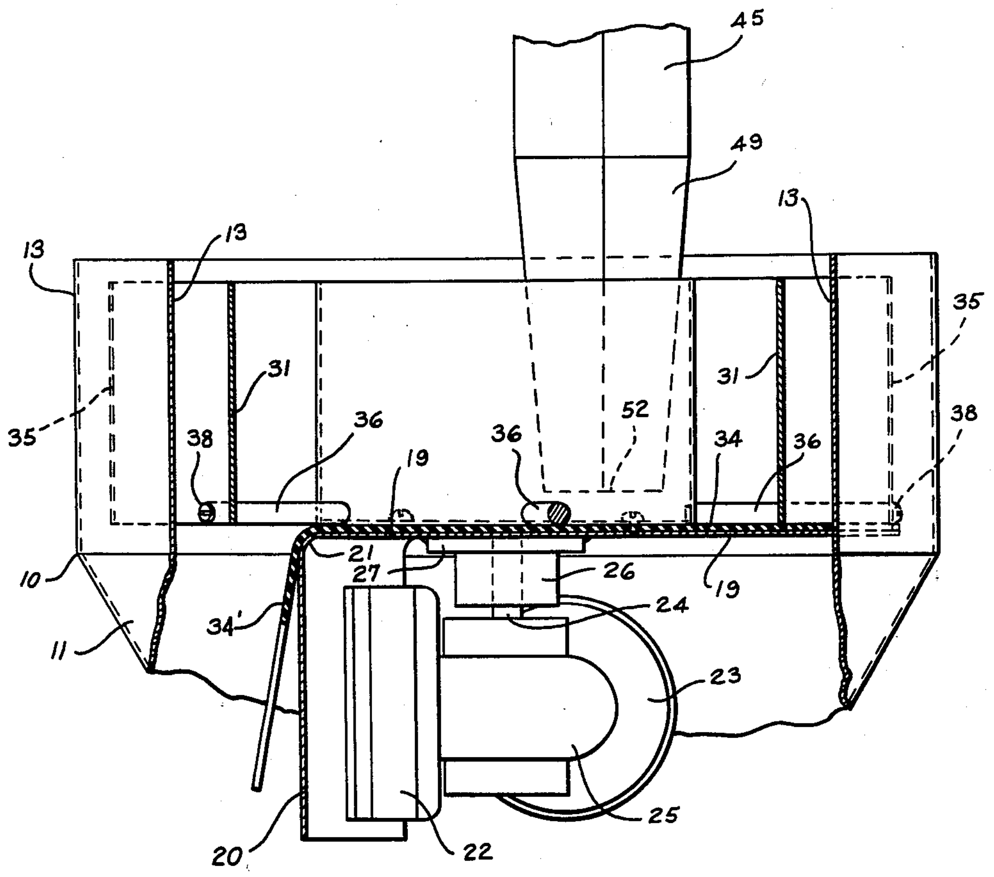
Fig. 3 is a section taken on the line 3—3 of Fig. 2, partly broken away.

Referring in detail to the drawings, in Fig. 1 is shown a stationary housing 10, which has a tapering lower hopper-like portion 11, which is mounted on a suitable receptacle 12, into which the material that is being weighed is fed after having been weighed. Said stationary housing 10 has an upstanding or vertically extending upper wall portion 13 that is preferably cylindrical in character. Said housing thus forms a stationary support for the feeding and weighing means to be described below, having fulcrum members 14 provided thereon for knife edged members 15 that provide pivots for the tiltably mounted disk-like member forming a portion of the conveying means for the material that is being weighed. The pivot members 15 are provided on brackets 16 and 17, as shown in Fig. 2, that have upstanding portions 18, on which said pivot members 15 are mounted in axial alignment with each other. Said brackets are mounted on a rigid support that has a planar portion 19, as shown in Fig. 3, and a substantially vertically extending portion 20 connected therewith by means of a curved portion 21. Said rigid supporting member is thus tiltably mounted about the axis of the pivot members 15.

Figure 5:
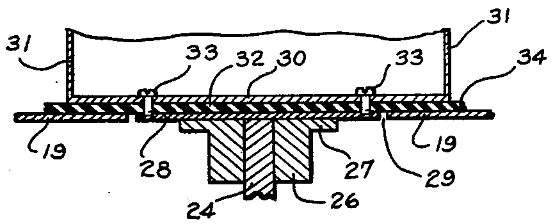
Fig. 5 is a fragmentary vertical section taken on the line 5—5 of Fig. 2.

Mounted on the vertically extending portion 20 of said rigid supporting member is a bracket 22, upon which a motor 23 is mounted, which drives the shaft 24 through a reduction gearing 25. The shaft 24 has a coupling mounted thereon that has the hub portion 26 fixed on the shaft 24 and the flange portion 27 secured to the disk-like member 28, as shown in Fig. 5, which is mounted within an opening 29 provided centrally of the rigid supporting member 19. The member 19, it will be noted, is tiltably mounted on the support 10, but is stationary with respect to the rotatable parts driven by the motor 23.

Mounted on the rotatable disk-like member 28 is a rotatable member that has a bottom wall 30, which is of a disk-like character, and an upstanding peripheral wall 31. Clamped between the wall 30 and the disk-like member 28 is a member 32 of flexible material, any suitable means, such as the securing elements 33, being provided for clamping said flexible member 32 between the members 28 and 30. Said flexible member has a peripheral portion 34 that extends beyond the outer edge of the disk-like member 28 and slidably engages the planar portion 19 of the rigid supporting means that is provided with the pivots 15 for tiltably mounting the disk-like member 28 and the driving means therefor. An outer upstanding wall 35 is also provided on the tiltable portion of the apparatus, said wall portions 31 and 35 being cylindrical in character and concentrically curved about the axis of the shaft 24. Rod-like members 36 extend between the walls 31 and 35 and are secured in fixed position to said walls in any suitable manner, as by means of the reduced threaded end portions 37 and the headed securing elements 38, as shown in Fig. 2, to secure the wall 35 in fixed position with respect to the wall 31. The walls 31 and 35 thus define an annular path between the same, and the peripheral portion 34 of the flexible member extends under the wall 35 so that the portion of the flexible member 32 that is supported by the planar portion 19 of the tiltably mounted stationary supporting means serves as conveying means operating over said planar wall portion 19 between said walls 31 and 35 and depends from the supported portion thereof, as shown at 34' in Figs. 1 to 4, inclusive, and Fig. 6.

The weighing means comprises a scalebeam 39 fixed on one of the pivot members 15 to move therewith, which has the counterpoise 40 slidably mounted thereon, and which is connected with a lever 41, in the form shown in Figs. 1 and 2 of the drawings, by means of an adjustable link connection having a pair of pivot ears 42 that have screw-threaded members 43 mounted therein, that are connected by means of a turnbuckle 44 for varying the length of the link connection between the members 39 and 41.

In the form of the invention shown in Figs. 1 to 5, inclusive, a feed chute 45 is provided, which has a lateral enlargement 46 thereon for accommodating the sector-like valve member 47, that has a curved wall portion 48 that is adapted to control the size of the discharge passage through said feed chute to the feed spout portion 49 thereof leading into the space between the walls 35 and 31 onto the belt 34 in vertically spaced relation to the axis of the pivot members 15, said sector 47 being fixed on the shaft 50 to rotate therewith, which shaft 50 in turn is fixed on the lever 41 to move therewith.

Upon reference to Fig. 2 it will be noted that the rigid support for the flexible member 32 having the planar portion 19 has the downturned portion 20 thereof extending so that the planar portion begins to support the belt 34 in advance of the spout 49, the rotation being in the direction of the arrow in Fig. 2. The curved portion 21 connecting the depending portion 20 and the planar portion 19 crosses the axis of the pivots 15 on the opposite side of the axis of rotation of the shaft 24 from the spout 49. Thus the spout 49 and discharge point of the conveying means are on opposite sides of the axis of rotation of the disk-like members 28 and 30 and of said conveying means. The material to be weighed is thus fed to the conveying means and discharged therefrom in vertically spaced relation to the tilting axis thereof defined by the pivots.

The fulcrums 14 are mounted in openings 51 in the upstanding wall portion 13, and pivot members 15 extend through said openings. The spout portion 49 of the feeding member 45 has its lower end edge 52 spaced a predetermined distance from the top surface of the portion 34 of the flexible belt 32 and extends well down in between the walls 31 and 35.

Figure 4:
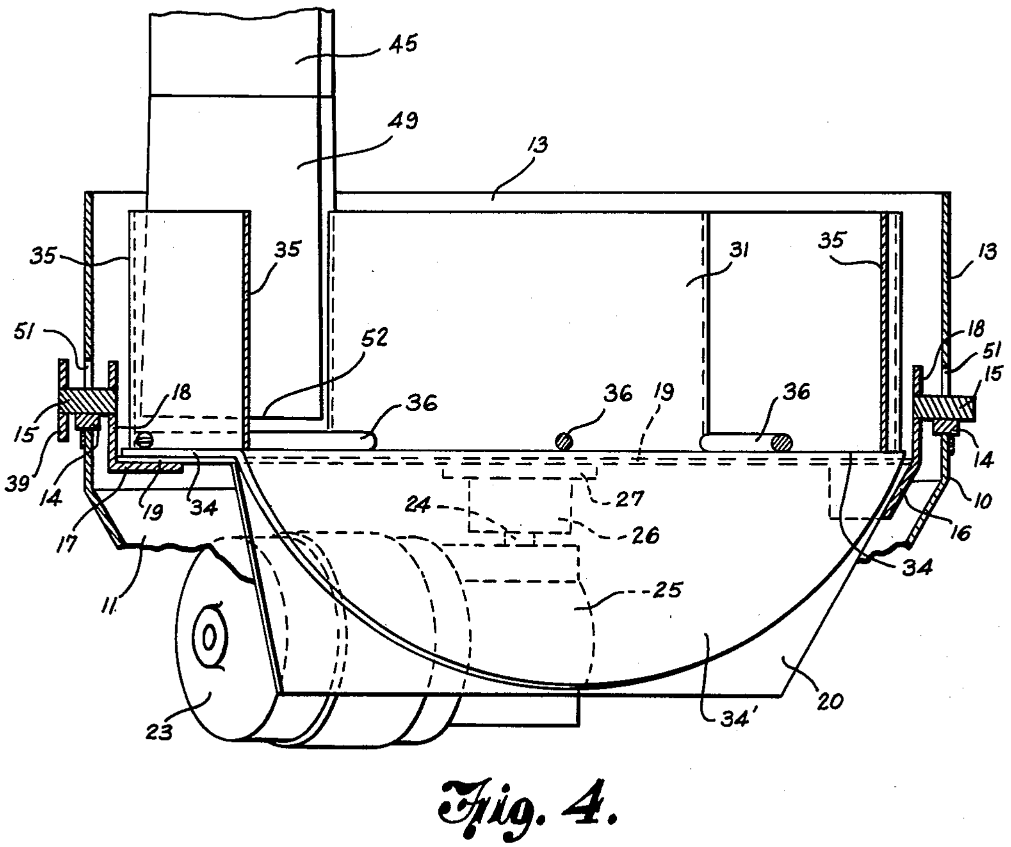
Fig. 4 is a section taken on the line 4—4 of Fig. 2, partly broken away.

In operation, the disk-like members 28 and 30 and the flexible member 32 rotate in the direction indicated by the arrow in Fig. 2 at a uniform rate. It will be obvious that all of the portion 34 of the belt lying between the spout 49 and the downturned portion 20 of the supporting surface 19 for the flexible conveying member lies on one side of the pivotal axis determined by the pivot members 15 and that thus the material on this portion of the rotating system will be continuously weighed by the weighing means. Furthermore, as the rotation takes place, the portion 34 of the flexible member 32 will slide over the flat or planar surface 19, and will flex downwardly as shown in Figs. 1, 3 and 4 as it travels over the rounded portion 21 connecting the depending wall 20 with the supporting wall 19 and will remain in such suspended position until it reaches the rounded portion 21 that is nearest the spout 49, whereupon it will travel up said rounded portion onto flat or planar portion 19 of the supporting member. The flexible conveying member or belt 32 will thus have the peripheral portion 34 thereof supported and dragging over the supporting member 19 from a point in advance of the feed of the material from the spout 49 onto the same to the position at which the belt portion 34 drops downwardly, as shown at 34' in Fig. 3, at which point discharge of the material carried on the peripheral portion 34 of the flexible member 32 will take place, the material dropping down into the portion 11 of the housing 10. The weight of the material on the portion of the conveying means that is on the supporting means 19 will be transferred to the supporting means and will thus tilt the supporting means about the axis of the pivots 15, dependent upon the amount of material that is on that portion of the conveying means, which will in turn cause movement of the scalebeam 39 either upwardly or downwardly to adjust the position of the valve or feed controlling member 47. The counterpoise 40 and the turnbuckle 44 can be adjusted so as to obtain the desired rate of feed when the scalebeam 39 is in balance. When the amount of material on the weighing portion of the conveyor is less than that desired, the scalebeam 39 will move downwardly, moving the lever 41 in a counterclockwise direction as viewed in Fig. 1 and opening the valve 47 further. When an excess of material is on the weighing means, movement in the opposite direction will take place of said valve member 47.

Figure 6:
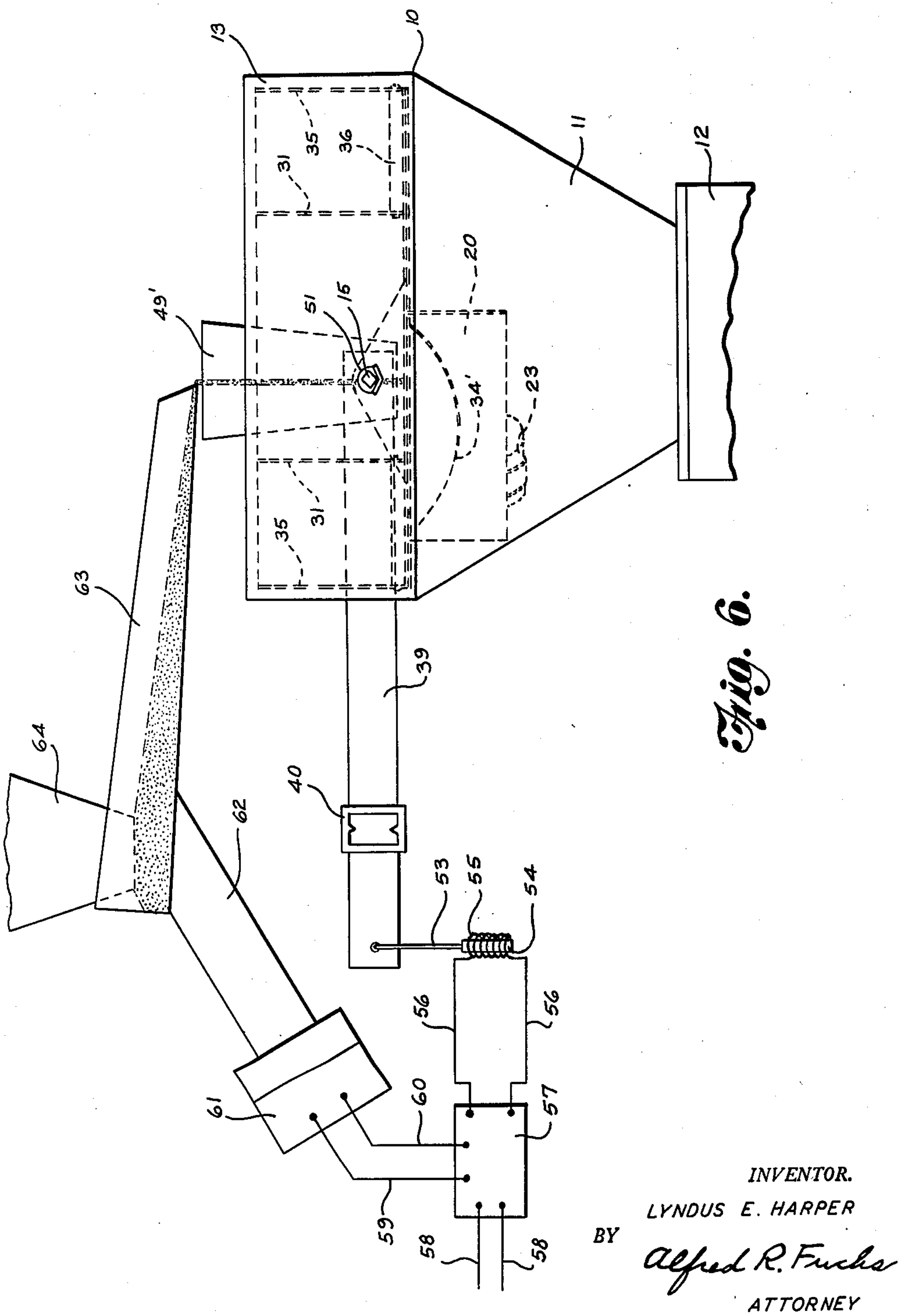
Fig. 6 is a view similar to Fig. 1 of a modification.

The particular controlling means for the feed actuated by the scalebeam may be varied as desired. In Fig. 6 a different arrangement of feed controlling means is shown, in which the scalebeam is provided with suspending means 53 for a metal core 54 of a solenoid winding 55, which is provided in a controlling circuit having the conductors 56 leading to an amplifier 57, with which the line wires 58 are connected, and which has an output circuit having the conductors 59 and 60 connected with the coil or winding of an electro-magnetic operating means 61 for a vibrating means 62 that vibrates a trough-like member 63 to which material is supplied from a hopper 64 and which discharges into a hopper 49', which is mounted in any suitable manner on the housing 10, and which extends between the walls 31 and 35 in the same manner as the spout 49. The position of the core 54 in the coil 55 controls the voltage of the output or operating circuit of the feeding means and the higher the voltage supplied to the electro-magnetic operating means 61 the greater will be the amplitude of the vibrations of the vibratory member 62 and of the tray-like member 63, and the greater will be the rate of feed into the hopper 49'. The greater the extent of the core 54 into the winding 55 the higher will be the voltage supplied to the eletcro-magnetic device 61. Accordingly, if the rate of feed of the vibratory feeding device is such that it is supplying a greater amount of material to the conveying means previously described, than is desired, the scalebeam 39 will rise at the end thereof to which the suspending means 53 is connected, withdrawing the core 54 a predetermined distance upwardly out of the winding 55, thus reducing the voltage supplied to the electro-magnetic means 61 and reducing the amplitude of the vibrations of the vibratory feeding means and thus the rate of feed. The particular vibratory feeding means and the details of construction thereof are not a part of my invention, but are merely illustrative of one of the many ways in which the scalebeam, the position of which is controlled by the disk-like weighing means, can be utilized to control the feed of material that is to be weighed and supplied to the container 12.

Figure 7:
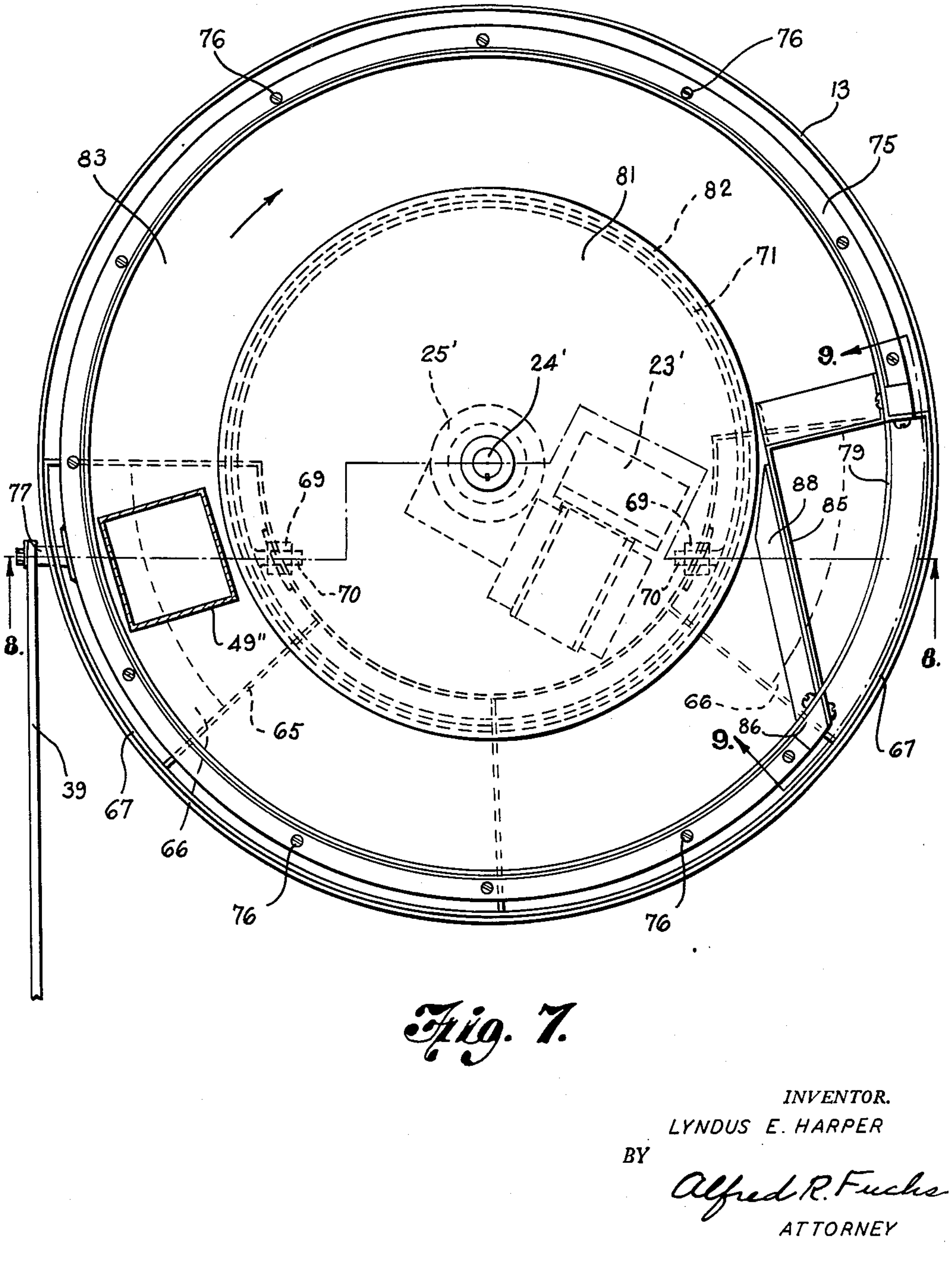
Fig. 7 is a view similar to Fig. 2 of the form of the invention in which the conveying means comprises a rigid peripheral portion on the rotatable tiltably mounted member.
Figure 8:
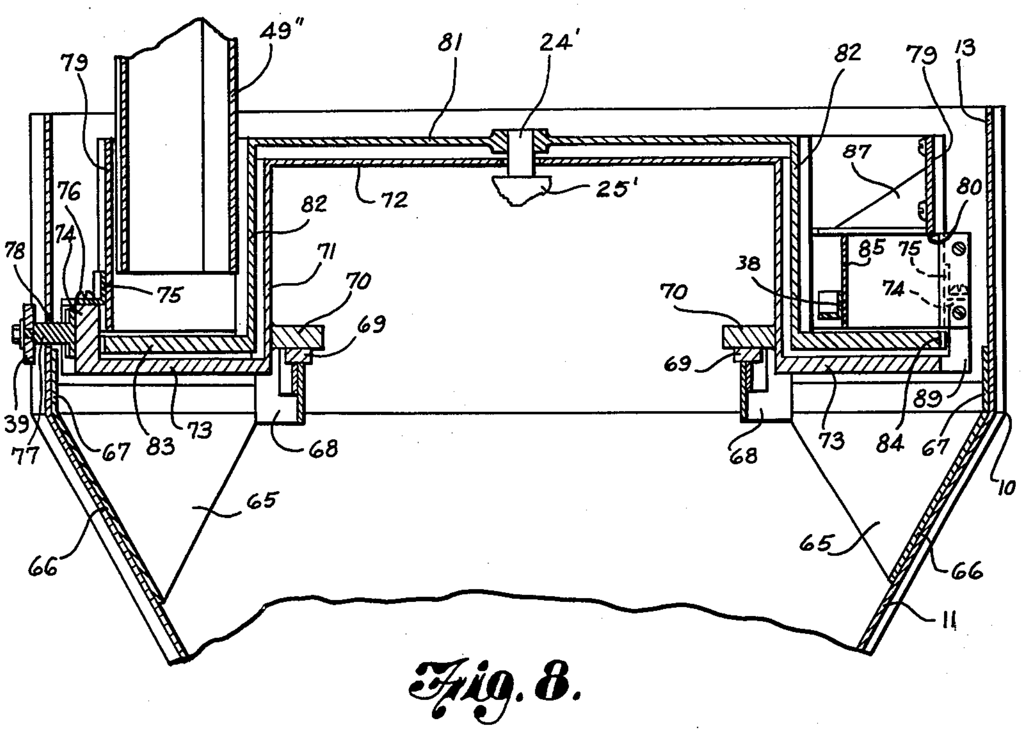
Fig. 8 is a section taken on the line 8—8 of Fig. 7, partly broken away.
Figure 9:
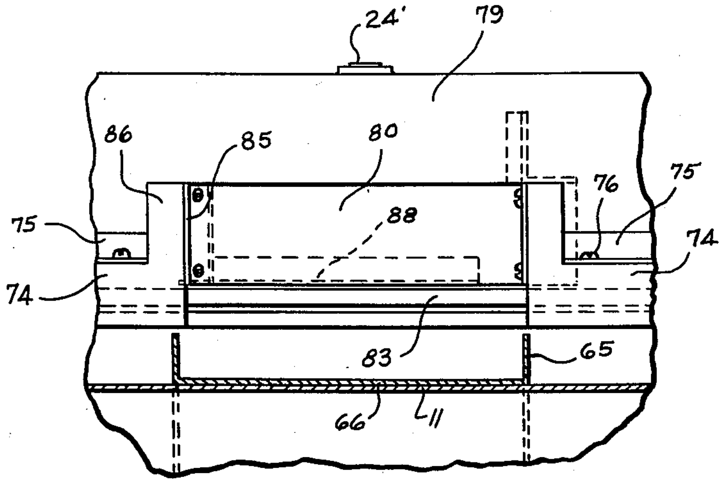
Fig. 9 is a fragmentary detail view taken on the line 9—9 of Fig. 7.

Instead of providing a feeding device in which a flexible member is utilized along with supporting means, withdrawn at a predetermined point to discharge the material therefrom, the feeding means shown in Figs. 7, 8 and 9 of the drawings can be utilized. In this form of the invention the supporting means is in the form of a housing that has the upstanding wall portion 13, as previously described, and the hopper-like tapering wall portion 11. Brackets 65 are provided, that are secured to the supporting means 10, and which have inclined portions 66 and vertically extending portions 67 secured to the wall portions 11 and 13, respectively. Said brackets also have vertically extending portions 68 thereon, on which the fulcrums 69 are mounted for the pivot members 70, the fulcrums 69 and the pivot members 70 being similar to the fulcrum members 14 and pivot members 15. The pivot members 70 are secured to a vertical upstanding annular wall 71, which depends from a central disk-like member 72, which is thus mounted to tilt about the axis of the pivot members 70 on the stationary support. Extending outwardly from the bottom edge of the upstanding wall 71 is an annular portion 73, which has an upstanding flange 74 thereon extending around the major portion of the annular wall 73, but having a gap therein, as will be referred to below. Mounted on the flange 74 and co-extensive therewith is an angle member 75, which is secured thereto by suitable securing elements 76. Also mounted on the flange 74 and extending outwardly therefrom in alignment with the pivot members 70 is an arm 77, upon which the scalebeam 39 is secured in fixed position so as to move about the pivotal axis of the members 70 therewith, said arm 77 extending through an opening 78 in the upstanding wall 13 of the housing.

Mounted on the angle member 75 is an upstanding curved wall 79, which is curved concentrically with the wall 71, and which has a discharge opening 80 therein. Upon reference to Fig. 9 it will be noted that the flange 74 and the angle member 75 extend from one end of the discharge opening 80 to the other end thereof around the periphery of the member 73, but that the annular portion 73 does not have any flange 74 thereon at said discharge opening 80. Mounted on a suitable bracket 22' provided on the upstanding wall 71 is a motor 23', which drives the shaft 24' through the reduction gearing 25' in substantially the same manner as previously described in connection with the form of the invention shown in Figs. 1 to 5, inclusive. Fixed on the shaft 24' to rotate therewith is the rotatable conveying means, which has a central disk-like portion 81 and an upstanding wall portion 82 depending from the disk-like portion 81, and an outer peripheral annular ledge portion 83. A spout 49'', similar to the spout 49, extends between the upstanding wall 82 and the upstanding wall 79 and discharges material to be weighed onto the ledge 83. The wall 79 in this form of the invention does not rotate with the rotatable conveying means, but the wall 82 does rotate therewith. It will be noted that the spout 49'' discharges the material that is to be weighed onto the ledge 83 in vertically spaced relation to the pivot axis defined by the pivot members 70 and that the discharge opening 80 is located in vertically spaced relation to said pivotal axis on the other side of the axis of rotation determined by the shaft 24' from that at which the spout 49'' is located. Means is provided for pushing or scraping the material, that is deposited on the conveying means 83 over the peripheral edge 84 of the rotating conveying means at the discharge opening 80 in the upstanding wall 79, comprising the blade 85, which is secured to the wall 79 at the outer end thereof by means of a suitable bracket 86 and by means of a transverse bracing member 87 extending from said wall 79 at the inner end thereof, said inner end being located closely adjacent the wall 82. Said scraper blade is further preferably provided with stiffening means, such as the angle member 88 extending lengthwise thereof.

It will be obvious that as the member 81 having the ledge 83 thereon is rotated in the direction indicated by the arrow in Fig. 7, the material discharged onto the same from the discharge spout 49'' will be carried around to the location of the scraper blade 85 where, by the action of the scraper blade, it will be pushed off over the peripheral edge 84 of the ledge 83 through the discharge opening 80 in the wall 79 and will drop through the opening 89 between the housing and the member 73 down into the hopper-like portion 11 thereof to the receptacle 12. It will also be obvious that as the member 81 rotates it will tilt on the axis of the pivot members 70 along with the member 72 in accordance with the weight of the material that is on the portion of the ledge 83 between the feed spout 49'' and the discharge opening 80. It will further be noted that both the feed spout 49'' and the discharge opening 80 are located substantially in vertical alignment with the axis of the pivot members 70. The operation of the device in controlling the feed to the spout 49'' is the same as in the other form of the invention, as the scalebeam 39 will be moved about the axis 70, as the tiltably mounted members tilt about the axis of the pivots 70. Thus, if more material than is desired is being fed to the rotatable conveying means, the end of the scalebeam remote from the arm 77 will rise and the feed will be reduced, while if less material is on that portion of the conveying means between the spout 49'' and the discharge opening 80, the end of the scalebeam remote from the member 77 will lower and the rate of feed will be increased.

Figure 10:
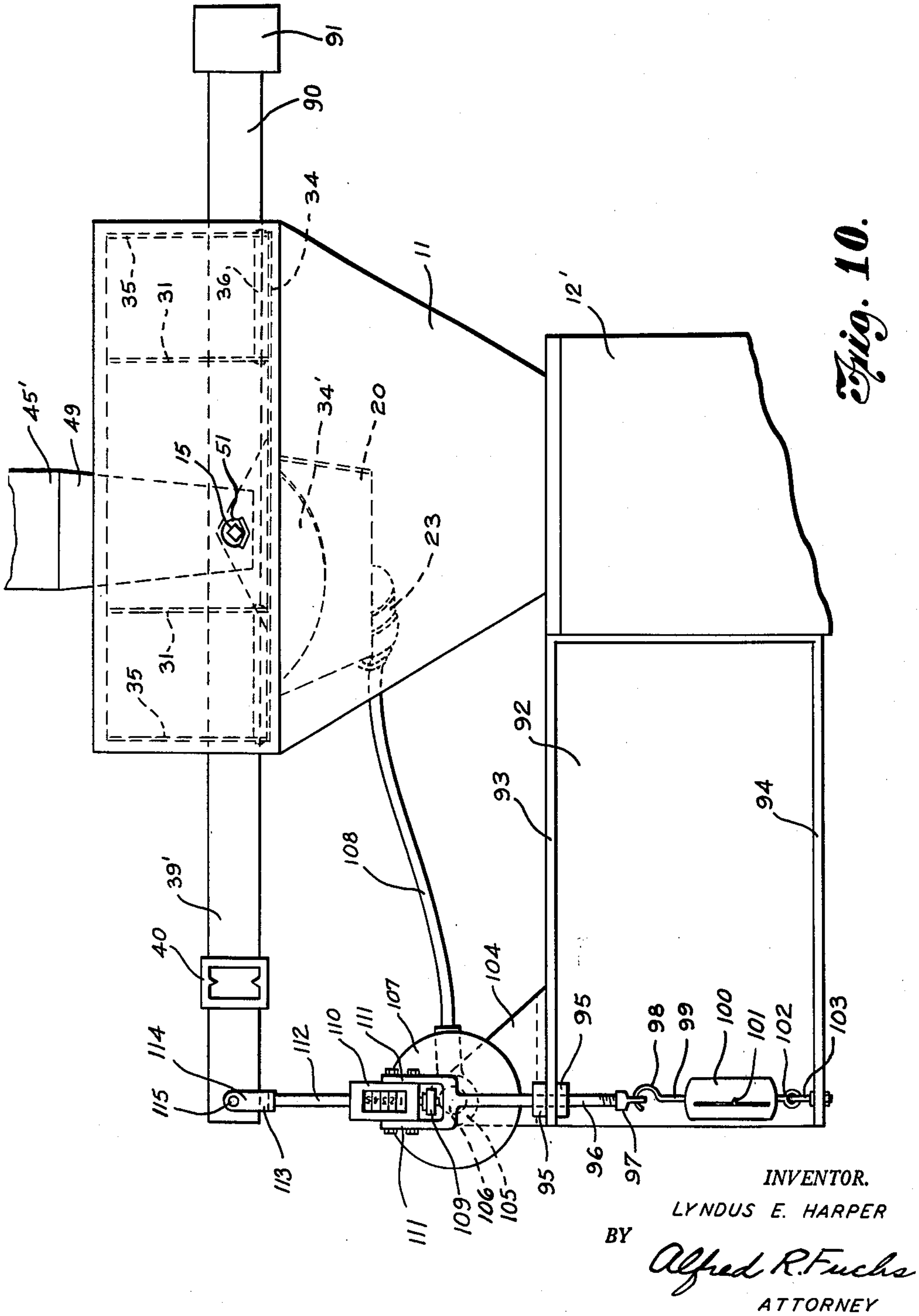
Fig. 10 is a view similar to Fig. 1 of a modification.

While with close control of the rate of feed by controlling means, such as shown in Figs. 1 to 5, inclusive, and Fig. 6, the position of the counterpoise 40 will indicate the weight of the material on the weighing means having either the movable flexible member 32 thereon, or the ledge 83 thereon, from which the scraper removes the material fed thereto, by the use of proper graduations on the scalebeam 39, if the apparatus is used for weighing in conjunction with feeding means that is not so controlled, but is manually or otherwise controlled, or should it be decided to totalize the weight of material passing through the tilting disk weigher and feeder, suitable means for indicating the weight on the weighing means at any instant and the total weight that has passed over the same, is provided. In Fig. 10 such means for indicating the weight at any instant and totalizing the weight of material that is passing through the machine is illustrated.

The rotatable weighing means that is provided in the form of the invention shown in Figs. 1 to 5, inclusive, is illustrated in Fig. 10, and the same reference numerals are applied to the corresponding parts thereof in Fig. 10 as in Figs. 1 to 5, inclusive. However, the feeding means 45' shown in Fig. 10, feeds to the spout 49 without the weighing means having any control thereover, as in the case of the forms of the invention previously described. Also the scalebeam 39' has an extension 90 on the opposite side of the pivot 15 from the counterpoise 40. Preferably, a counterweight 91 is provided on the arm 90 of the scalebeam for counterbalancing the weight of the apparatus that is hung from the scalebeam for indicating the weight at any instant and the total weight.

Any suitable means is provided for mounting and guiding the moving parts of the weight indicating means, which may be in the form of a bracket 92 mounted on the receptacle 12', upon which the hopper-like housing portion 11 is mounted in the same manner as previously described in connection with the receptacle 12. Said bracket 92 is provided with a flange 93 and a flange 94. Suitable guide sleeves 95 are provided on the flange 93 for slidable movement therethrough of the rod 96, which has a fitting 97 screw-threadedly connected with one end thereof, that has an opening therein for the hook 98 on the rod-like member 99, which is secured to the spring scales 100 in such a manner that the movement of the rod-like member 99 will produce a reading on a suitable scale provided on said spring scales 100 by means of the indicating means 101, said spring scales having an eye member 102 on the body portion thereof, which is secured to a suitable eye member 103 mounted on the flange 94.

A bracket 104 is provided on the bracket 92 and extending upwardly therefrom, which is provided with suitable bearing means 105 for a shaft 106 upon which, to rotate therewith, a disk-like member 107 is mounted. Said shaft 106 is driven by means of suitable gearing from a flexible shaft 108, which is connected with the motor 23, the gearing being of such a character that the disk 107 will rotate at a desired speed. Frictionally engaging the surface of the disk 107 is a contact wheel 109, which is mounted in suitable bearings in a desired manner on the revolution counter 110. Secured to the housing of the revolution counter by suitable bolt-like members or other similar fastenings, are the arms 111 of the bifurcated end of the rod-like member 96, and also secured in fixed position on the housing of the revolution counter 110 is a rod-like member 112, which has a fitting 113 fixed on the end thereof that is provided with a pair of ears 114 that are pivotally connected at 115 with the scalebeam 39'.

It will be obvious, with the arrangement of devices shown in Fig. 10, that when the scalebeam 39' rises on the end thereof that has the pivot pin 115 thereon, the contact wheel 109 will move upwardly on the surface of the rotating disk 107, while, if the scalebeam 39' descends on that end, the contact wheel 109 will travel downwardly toward the center of rotation of the disk-like member 107. The revolution counter 110 is calibrated so that the reading thereof will indicate the material passing through the weighing means in suitable units of weight, and the spring scale 100 is similarly calibrated so that the scale thereon will show the quantity by weight of material on the weighing means at any instant in accordance with the position of the end of the scalebeam 39' that has the pivot member 115 thereon. It will be obvious that, as the weight of material fed onto the weighing means through the spout 49 increases, the scalebeam 39' will rise at the end thereof that has the pivot member 115 thereon, and as this takes place, the rate of rotation of the contact wheel 109 will increase, although the rate of rotation of the member 107 is constant, said increase corresponding to the increase in weight of material that is passing over the weighing means, and the revolution counter will thus properly indicate the total weight that is fed through the weighing device. Also, as the scalebeam rises, the pointer 101 on the spring scale will move upwardly along the scale, compressing the spring in the spring scale proportionately and indicating the weight of material at any one instant on the weighing means.

What I claim is:

1. In a weighing device, a member adapted to receive material to be weighed thereon, means for mounting said member to tilt about a transverse axis lying in a vertical plane extending across said member, means for rotating said member about an upstanding axis, means for feeding material to be weighed onto said member in vertically spaced relation to said tilting axis and means for discharging material from said member in vertically spaced relation to said tilting axis.

2. In a weighing device, a member adapted to receive material to be weighed thereon, means for mounting said member to tilt about a horizontal axis, means for rotating said member about an axis extending perpendicularly to said horizontal axis adjacent thereto, means for feeding material to be weighed onto said member in vertical alignment with said tilting axis at one side of said axis of rotation and means for discharging material from said member in vertical alignment with said tilting axis.

3. In a weighing device, a member adapted to receive material to be weighed thereon, means for mounting said member to tilt about a transverse axis lying in a vertical plane extending across said member, means for rotating said member about an upstanding axis, means for feeding material to be weighed onto said member in vertical alignment with said tilting axis, means for discharging material from said member in vertical alignment with said tilting axis, and a scalebeam mounted to tilt about said transverse axis with said member.

4. In a weighing device, a member adapted to receive material to be weghed thereon, means for mounting said member to tilt about a transverse axis, means for rotating said member about an upstanding axis adjacent said transverse axis, means for feeding material to be weighed onto said member in vertically spaced relation to said tilting axis, means for discharging material from said member in vertically spaced relation to said tilting axis, a scalebeam mounted to tilt about said transverse axis with said member and means responsive to the position of said scalebeam to control the rate of feed of said feeding means.

5. In a weighing device, a support, a member mounted on said support to tilt about a transverse axis lying in a vertical plane extending across said member, rotary material conveying means comprising a disk-like member mounted on said tiltably mounted member for rotation thereon about an axis extending perpendicularly to said transverse axis, means for feeding material onto said conveying means in vertically spaced relation to said transverse axis at one side of said axis of rotation, means for discharging material from said conveying means in vertically spaced relation to said transverse axis on the other side of said axis of rotation and means on said tiltably mounted member for rotating said disk-like member about said axis of rotation.

6. In a weighing device, a support, a member mounted on said support to tilt about a horizontal axis, rotary material conveying means comprising a disk-like member mounted on said tiltably mounted member for rotation thereon about an axis extending perpendicularly to said horizontal axis adjacent thereto, means for feeding material onto said conveying means in vertically spaced relation to said horizontal axis at one side of said axis of rotation, means for discharging material from said conveying means in vertically spaced relation to said horizontal axis in the other side of said axis of rotation and means on said tiltably mounted member for rotating said disk-like member about said axis of rotation.

7. In a weighing device, a support, a member mounted on said support to tilt about a transverse axis, material conveying means comprising an inner rigid portion mounted on said tiltably mounted member for rotation thereon about an axis extending perpendicularly to said transverse axis and an outer flexible portion secured to said inner portion to rotate therewith, means for feeding material onto said flexible portion in vertically spaced relation to said transverse axis at one side of said axis of rotation, a support for said flexible portion extending from under said feeding means to a position in vertically spaced relation to said transverse axis on the other side of said axis of rotation and means on said tiltably mounted member for rotating said conveying means about said axis of rotation.

8. In a weighing device, a support, a member mounted on said support to tilt about a transverse axis, material conveying means comprising an inner rigid disk-like portion mounted on said tiltably mounted member for rotation thereon about an axis extending perpendicularly to said transverse axis and a member of flexible material secured to said disk-like portion to rotate therewith and having an annular portion extending outwardly beyond the periphery of said disk-like portion, means for feeding material onto said annular portion of said flexible member in vertical alignment with said transverse axis at one side of said axis of rotation, a stationary support for said annular portion extending from under said feeding means to a positon adjacent said transverse axis on the other side of said axis of rotation and means on said tiltably mounted member for rotating said conveying means about said axis of rotation.

9. In a weighing device, a support, a member mounted on said support to tilt about a transverse axis, material conveying means comprising a disk-like member mounted on said tiltably mounted member for rotation thereon about an axis extending perpendicularly to said transverse axis, said disk-like member having an annular peripheral shelf thereon, means for feeding material onto said shelf in vertical alignment with said transverse axis at one side of said axis of rotation, means for discharging material from said shelf in vertical alignment with the outer edge thereof over said transverse axis on the other side of said axis of rotation and means on said tiltably mounted member for rotating said conveying means about said axis of rotation.

10. In a weighing device, a support, a member mounted on said support to tilt about a transverse axis, rotary material conveying means comprsing a disk-like member mounted on said tiltably mounted member for rotation thereon about an axis extending perpendicularly to said transverse axis, said disk-like member having an annular wall depending from the periphery thereof, an annular shelf extending outwardly from said depending wall, an upstanding wall mounted on said tiltably mounted member adjacent the outer periphery of said shelf, means for feeding material onto said shelf in vertically spaced relation to said transverse axis at one side of said axis of rotation, said upstanding wall having a discharge opening therein in vertically spaced relation to said transverse axis on the other side of said axis of rotation, means for discharging material from said shelf over the outer periphery thereof through said discharge opening comprising a scraper engaging said shelf and means on said tiltably mounted member for rotating said conveying means about said axis of rotation.

11. In a weighing device, a support, a member mounted on said support to tilt about a transverse axis, material conveying means comprising a disk-like member mounted on said tiltably mounted member for rotation thereon about an axis extending perpendicularly to said transverse axis, said disk-like member having an annular peripheral shelf thereon, means for feeding material onto said shelf in vertical alignment with said transverse axis at one side of said axis of rotation, means for discharging material in vertical alignment with said transverse axis on the other side of said axis of rotation, means on said tiltably mounted member for rotating said conveying means about said axis of rotation and a scalebeam mounted to tilt about said transverse axis with said tiltably mounted member.

12. In a weighing device, a support, a member mounted on said support to tilt about a transverse axis, material conveying means comprising a disk-like member mounted on said tiltably mounted member for rotation thereon about an axis extending perpendicularly to said transverse axis, said disk-like member having an annular peripheral shelf thereon, means for feeding material onto said shelf in vertically spaced relation to said transverse axis at one side of said axis of rotation, means for discharging material in vertically spaced relation to said transverse axis on the other side of said axis of rotation, means on said tiltably mounted member for rotating said conveying means about said axis of rotation, a scalebeam mounted to tilt about said transverse axis with said tiltably mounted member, and means responsive to the position of said scalebeam to control the rate of feed of said feeding means.

13. In a weighing device, a support, a member mounted on said support to tilt about a transverse axis, rotary material conveying means comprising a disk-like member mounted on said tiltably mounted member for rotation thereon about an axis extending perpendicularly to said transverse axis adjacent thereto, means for feeding material onto said conveying means in vertically spaced relation to said transverse axis at one side of said axis of rotation, means for discharging material from said conveying means in vertically spaced relation to said transverse axis on the other side of said axis of rotation, means on said tiltably mounted member for rotating said disk-like member about said axis of rotation and a scalebeam mounted to tilt about said transverse axis with said tiltably mounted member.

14. In a weighing device, a support, a member mounted on said support to tilt about a transverse axis, rotary material conveying means comprising a disk-like member mounted on said tiltably mounted member for rotation thereon about an axis extending perpendicularly to said transverse axis adjacent thereto, means for feeding material onto said conveying means in vertically spaced relation to said transverse axis at one side of said axis of rotation, means for discharging material from said conveying means in vertically spaced relation to said transverse axis on the other side of said axis of rotation, means on said tiltably mounted member for rotating said disk-like member about said axis of rotation, a scalebeam mounted to tilt about said transverse axis with said tiltably mounted member and means responsive to the position of said scalebeam to control the rate of feed of said feeding means.

15. In a weighing device, a support, a member mounted on said support to tilt about a transverse axis, rotary material conveying means comprising a disk-like member mounted on said tiltably mounted member for rotation thereon about an axis extending perpendicularly to said transverse axis, inner and outer upstanding walls mounted to rotate with said disk-like member, a member of flexible material secured to said disk-like member to rotate therewith having an annular portion extending outwardly beyond said disk-like member under said upstanding walls, means for feeding material onto said flexible member between said walls in vertical alignment with said transverse axis at one side of said aixs of rotation, a stationary support for said annular portion extending from under said feeding means to a position on the other side of said axis of rotation and means on said tiltably mounted member for rotating said conveying means about said axis of rotation.

16. In a weighing device, a support, a member mounted on said support to tilt about a transverse axis, said tiltably mounted member having inner and outer concentrically curved upstanding walls thereon, and conveying means mounted thereon to extend between said walls and rotate about the axis of curvature of said walls, means for feeding material onto said conveying means in vertical alignment with said transverse axis at one side of said axis of rotation, means for discharging material from said conveying means in vertical alignment with said transverse axis on the other side of said axis of rotation and means on said tiltably mounted member for rotating asid conveying means about said axis of rotation.

17. In a weighing device, a support, a member mounted on said support to tilt about a transverse axis, said tiltably mounted member having inner and outer concentrically curved upstanding walls mounted thereon to rotate about their axis of curvature and conveying means mounted thereon to extend between said walls and rotate therewith about said axis of curvature, means for feeding material onto said conveying means in vertically spaced relation to said transverse axis at one side of said axis of rotation, means for discharging material from said conveying means in vertically spaced relation to said transverse axis on the other side of said axis of rotation and means on said tiltably mounted member for rotating said conveying means about said axis of rotation.

18. In a weighing device, a support, a member mounted on said support to tilt about a transverse axis, said tiltably mounted member having inner and outer concentrically curved upstanding walls thereon, and conveying means mounted thereon to extend between said walls and rotate about the axis of curvature of said walls, said inner upstanding wall being mounted to rotate with said conveying means and said outer upstanding wall being fixed on said tiltably mounted member, means for feeding material onto said conveying means between said inner and outer walls in vertical alignment with said transverse axis at one side of said axis of rotation, said outer wall having a discharge opening therein in vertical alignment with said transverse axis on the other side of said axis of rotation, means for discharging material from said conveying means through said discharge opening and means on said tiltably mounted member for rotating said conveying means about said axis of rotation.

19. In a weighing device, a support, a member mounted on said support to tilt about a transverse axis, said tiltably mounted member having inner and outer concentrically curved upstanding walls thereon, and conveying means mounted thereon to extend between said walls and rotate about the axis of curvature of said walls, said conveying means comprising a flexible member, guide means for said flexible member comprising a planar support fixed on said tiltable member slidably engaged by said flexible member and extending between said inner and outer upstanding walls, means for feeding material onto said conveying means in vertically spaced relation to said transverse axis at one side of said axis of rotation between said walls, said planar support extending from under said feeding means to a position adjacent said transverse axis on the other side of said axis of rotation and means on said tiltably mounted member for rotating said conveying means about said axis of rotation.

20. In a weighing device, a support, a member mounted on said support to tilt about a transverse axis, said tiltably mounted member having inner and outer concentrically curved upstanding walls therein, and conveying means mounted thereon to extend between said walls and rotate about the axis of curvature of said walls, said conveying means comprising a flexible member, guide means for said flexible member comprising a planar support fixed on said tiltable member slidably engaged by said flexible member and extending between said inner and outer upstanding walls and a depending guide wall between the ends of said planar support, means for feeding material onto said conveying means in vertical alignment with said transverse axis at one side of said axis of rotation between said walls, said planar support extending from under said feeding means to a position adjacent said transverse axis on the other side of said axis of rotation and means on said tiltably mounted member for rotating said conveying means about said axis of rotation.

References Cited in the file of this patent

UNITED STATES PATENTS 2,619,256 Wiley ---------------- Nov. 25, 1952